J. A. Smith,
Swinging Gate.
N° 82,648.  Patented Sep. 29, 1868.
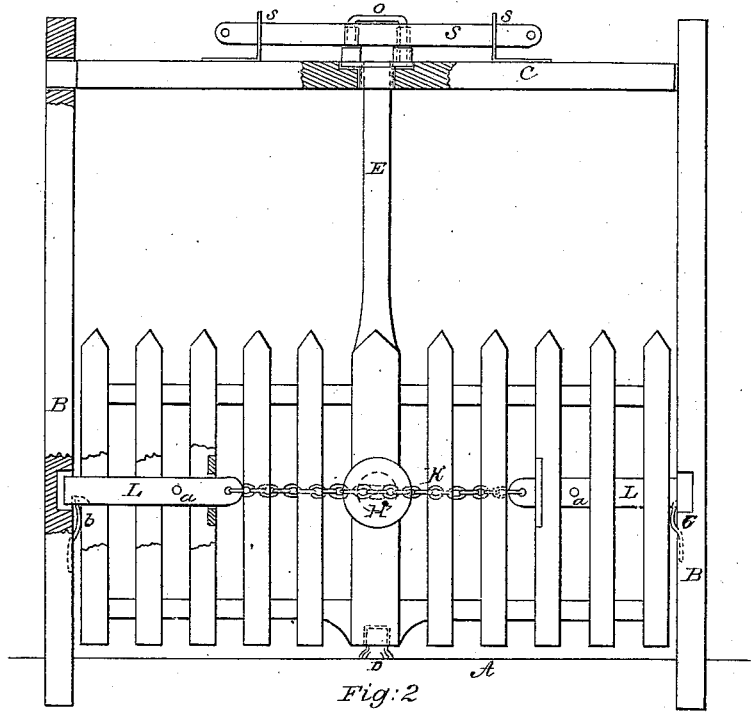
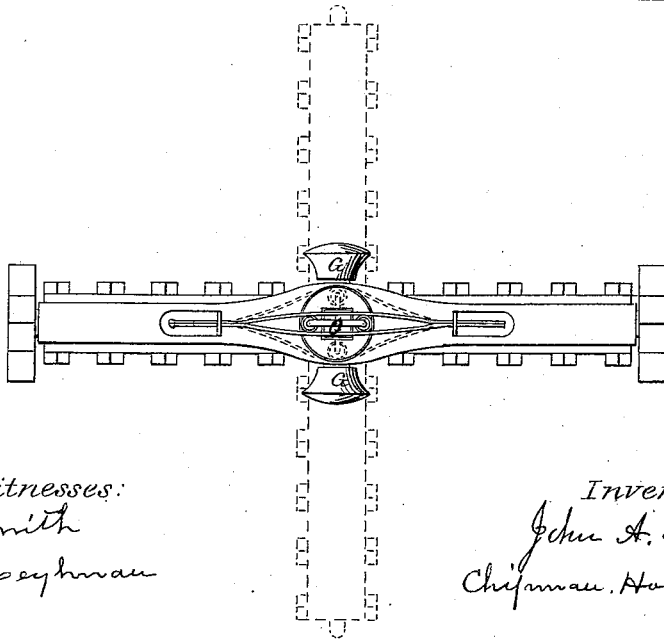
Witnesses:
J. C. Smith
A. S. Heyhman
Inventor:
John A. Smith
Chipman, Hosmer & Co.
att'ys

United States Patent Office.

JOHN A. SMITH, OF LACON, ILLINOIS.

*Letters Patent No. 82,648, dated September 29, 1868.*

IMPROVEMENT IN GATES.

*The Schedule referred to in these Letters Patent and making part of the same.*

TO ALL WHOM IT MAY CONCERN:

Be it known that I, JOHN A. SMITH, of Lacon, in the county of Marshall, and State of Illinois, have invented a new and valuable Improvement in Gates; and I do hereby declare that the following is a full, clear, and exact description of the construction and operation of the same, reference being had to the annexed drawings, making a part of this specification, and to the letters and figures of reference marked thereon.

Figure 1, of the drawings, is a representation of side view of my device, and

Figure 2 is a horizontal view thereof.

The object of my invention is to provide a gate for farm and turnpike-road purposes that shall be more perfect in operation than any similar device heretofore known or used.

The letter A, of the drawings, represents the ground or road across which the gate is erected.

Letters B show the side posts, and letter C the top cross-bar. The side posts are fastened in the ground, and the cross-bar is adjusted in said posts, so as to allow it to move and turn around on its bearings.

My gate proper is formed with an upper and lower cross-bar, and a double set of upright slats, as shown on the drawings, and it stands on a pivot, D, adjusted in the ground. A post, E, extends from the upper cross-bar of the gate proper to the top cross-bar C, in which it moves, as hereinafter mentioned.

Letters G are knobs, attached to the roller H, and with which said roller is actuated.

Letter K is a chain, that passes through roller H, and is connected, at each end, with the snaps L, respectively. These snaps are constructed and adjusted in the form and manner shown, and are designed to operate as fasteners of the gate. Small pins, $a$, pass through these snaps, respectively, which, operating between the contiguous slats of the gate, serve to regulate the movements of said snaps.

Letters $b$ are springs, that serve to return the snaps L to their places in the side posts after they have been drawn inward by the operator. I usually bevel a small piece of the inside of the side posts sufficient to allow the snaps L to move therein, and at the inside centres of said posts, directly opposite said snaps, I make a mortise, into which said snaps are forced by the springs $b$, and thereby the gate is fastened securely.

On the top of the top cross-bar C, I adjust two staples, in the form and manner shown at $c$ $c$, and in said staples adjust the main-spring S, also in the manner represented on the drawings. This main-spring is composed of two thin plates of steel, placed side by side, and riveted together at each end. I place them in the staples $c$ $c$, in such a manner as to allow them to be moved either to the right or left to any desired distance, at the will of the operator.

On the top of post E, and in the centre of cross-bar C, I attach the staple O. This last-mentioned staple is adjusted between the two plates of spring S, and, in conjunction therewith, serves to close the gate with great rapidity. I usually place a small friction-roller on each flanch of staple O, below the spring S, to aid in movements connected with the operation of the same. These rollers are shown by the letters $d$ $d$ of the drawings.

It will readily be seen that my gate is allowed to swing in either direction, at the will of the operator, and may be closed with great rapidity by a mere touch of the hand. It will also be noticed that, by reason of the peculiar method of adjustment of the main spring in its staples, I can add to the shutting force of the gate, or decrease therefrom, by simply sliding said spring to the right, left, or centre, as the case may be.

To remove the gate, I have only to lift it upward in the frame, when the cross-piece C will be moved on its arbors at will, the staple O will pass from between the plates of spring S, and the work is done.

For turnpike-roads, and all other places where it may be important to secure a rapid closing of the gate, I consider my device of great value. It is also very valuable in that, by reason of standing on a pivot, and being firmly secured at the top, all sagging and side inclinations are avoided, thereby securing permanency and perfect action at all times.

It will be noticed that the gate is opened by simply turning either of the knobs G in either direction, and the gate swings on its pivot until it reaches a point at right angles with the frame where it is held by the spring S until it is desirable to close it.

What I claim as my invention, and desire to secure by Letters Patent, is—

A gate, having side posts B, cross-bar C, staples O and $c$ $c$, spring S, post E, and pivot D, constructed, arranged, and operating substantially as herein specified.

In testimony that I claim the above, I have hereunto subscribed my name in the presence of two witnesses.

J. A. SMITH.

Witnesses:
 JAMES H. SPENCER,
 JAMES T. SMITH.